United States Patent
Quintero-Fuentes et al.

(10) Patent No.: US 12,324,454 B2
(45) Date of Patent: Jun. 10, 2025

(54) TEMPERATURE CONTROL FOR A ROTARY HEAD EXTRUDER

(71) Applicant: Frito-Lay North America, Inc., Plano, TX (US)

(72) Inventors: Ximena Quintero-Fuentes, Plano, TX (US); Pavan Harshit Manepalli, Plano, TX (US); Robert Egnatchik, Carrollton, TX (US)

(73) Assignee: Frito-Lay North America, Inc., Plano, TX (US)

( * ) Notice: Subject to any disclaimer, the term of this patent is extended or adjusted under 35 U.S.C. 154(b) by 284 days.

(21) Appl. No.: 17/552,928

(22) Filed: Dec. 16, 2021

(65) Prior Publication Data

US 2023/0189867 A1    Jun. 22, 2023

(51) Int. Cl.
| | |
|---|---|
| *A23P 30/20* | (2016.01) |
| *A21D 8/06* | (2006.01) |
| *A23P 30/38* | (2016.01) |
| *H05B 1/02* | (2006.01) |
| *H05B 3/06* | (2006.01) |
| *G05D 23/00* | (2006.01) |

(52) U.S. Cl.
CPC .............. *A23P 30/20* (2016.08); *A21D 8/06* (2013.01); *A23P 30/38* (2016.08); *H05B 1/0244* (2013.01); *H05B 3/06* (2013.01); *G05D 23/00* (2013.01)

(58) Field of Classification Search
CPC . A23P 30/20; A23P 30/38; A21D 8/06; H05B 1/0244; H05B 3/06
See application file for complete search history.

(56) References Cited

U.S. PATENT DOCUMENTS

| | | |
|---|---|---|
| 3,829,270 A | 8/1974 | Verburg et al. |
| 6,224,933 B1 | 5/2001 | Bhaskar et al. |
| 6,586,031 B1 | 7/2003 | Kelly |
| 9,669,574 B2 | 6/2017 | Morales-Alvarez et al. |
| 2003/0056657 A1 | 3/2003 | Warner et al. |
| 2006/0150828 A1 | 7/2006 | Quackenbush et al. |

(Continued)

FOREIGN PATENT DOCUMENTS

| | | |
|---|---|---|
| WO | 2010/078462 | 7/2010 |
| WO | 2016/129998 | 8/2016 |
| WO | 2017/027599 | 2/2017 |

OTHER PUBLICATIONS

International Search Report and Written Opinion issued on Apr. 12, 2023 in PCT/US2022/052387.

*Primary Examiner* — Alison L Hindenlang
*Assistant Examiner* — Alexander A Wang
(74) *Attorney, Agent, or Firm* — Barnes & Thornburg LLP; G. Peter Nichols (57) ABSTRACT

An improved rotary head extruder has at least one rotatable auger disposed within a single barrel and having an upstream end and a downstream end. The extruder has a die assembly that includes (i) a stator having a stator head at the downstream end of the at least one rotatable auger and a stationary plate surrounding an outlet end of the stator downstream from the single barrel and (ii) a rotatable plate downstream and spaced apart from the stationary plate to define a die gap. The apparatus includes a heating mechanism to maintain, within a predefined temperature range, one or more of the temperature of the die assembly or an extrudable composition disposed in the die gap.

8 Claims, 7 Drawing Sheets

(56) References Cited

U.S. PATENT DOCUMENTS

| | | |
|---|---|---|
| 2007/0154609 A1 | 7/2007 | Li et al. |
| 2010/0196549 A1 | 8/2010 | Rivera et al. |
| 2011/0151097 A1 | 6/2011 | Tuason et al. |
| 2012/0225154 A1* | 9/2012 | Carlson .................. A23P 30/20 |
| | | 425/306 |
| 2013/0273219 A1 | 10/2013 | Baier et al. |
| 2016/0128362 A1 | 5/2016 | Morales-Alvarez et al. |
| 2017/0202262 A1 | 7/2017 | Morales-Alvarez et al. |
| 2017/0223992 A1 | 8/2017 | Morales-Alvarez et al. |
| 2018/0258242 A1 | 9/2018 | Krause et al. |
| 2022/0087303 A1* | 3/2022 | Santamaria Perez ... A23L 7/197 |

* cited by examiner

TEMPERATURE CONTROL FOR A ROTARY HEAD EXTRUDER

BACKGROUND

The present invention generally relates to an improved rotary head extruder for producing random extruded collets.

Figure 1:
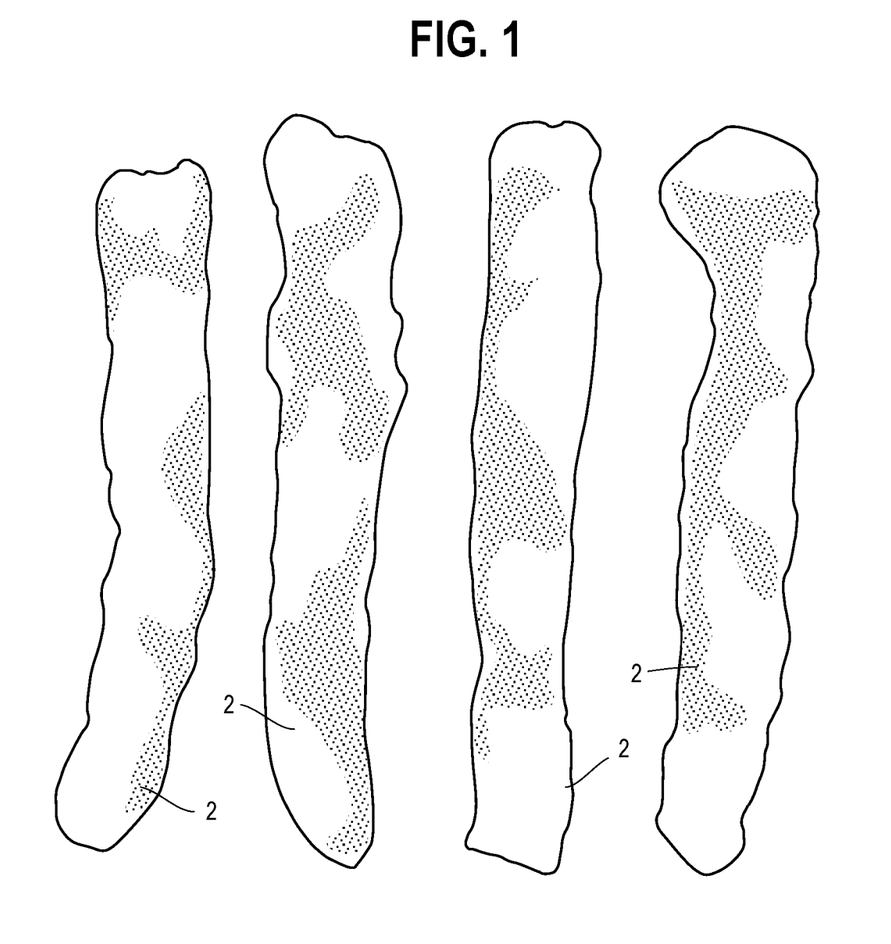
FIG. 1 depicts typical random collets as known in the industry.

In the formation of random collets produced by a rotary head extruder, as depicted in FIG. 1, it has been found that materials that cannot be sufficiently hydrated because of their starch content (e.g., chickpeas, lentils, whole grains and the like) or because of the time of harvesting (e.g. the new crop season for cornmeal) result in an uneven viscosity of the dough to be extruded, causing uneven heat generation as the dough is being extruded which leads to an unexpanded product. In addition, such products detrimentally affect the performance of the random extruder because of encrustation (glazing) that forms on the extruder rotor and/or stator.

SUMMARY

According to one aspect of the disclosure, a rotary head extruder used for processing an extrudable composition comprises at least one rotatable auger disposed within a single barrel and having an upstream end and a downstream end, a die assembly, and a heating mechanism. The rotary head extruder may comprise a single rotatable auger, two rotatable augers, or more. In some aspects, the die assembly comprises a stator having a stator head at the downstream end of the at least one rotatable auger and a stationary plate surrounding an outlet end of the stator downstream from the single barrel and a rotatable plate downstream from and spaced apart from the stationary plate to define a die gap. The die gap may be adjusted based on desired operating parameter and, to that end, the die gap may be in the range from about 0.8 to about 2.5 mm.

Advantageously, the heating mechanism maintains, within a defined temperature range, one or more of the temperature of the extrudable composition present in the die gap or the stator. The defined temperature range may be between about 260° F. and about 320° F. In some embodiments, the heating mechanism does not reduce the temperature of the stator or of the extrudable composition. In still other embodiments, the heating mechanism does not cool the work zone (i.e., the rotor, stator, the die gap, and areas near and adjacent those parts).

The heating mechanism may comprise a band heater at least partially enclosing one or more of a portion of the die assembly and in particular may at least partially enclose one or more of the stator, the stator head, the stationary plate or the rotor. Alternatively, the heating mechanism may comprise at least one internal channel provided in the die assembly and may, in certain instances, be provided in one or more of the stator, the stator head, or the stationary plate. In some embodiments, the at least one internal channel may be in fluid communication with one or more ports to facilitate the flow of fluid through the internal channel. In further embodiments, a liquid may be disposed within the internal channel. In other embodiments, the heating mechanism may include, but is not limited to, a heating jacket, forced air, ambient air, and electrical devices.

Another aspect of the disclosure relates to a method for extruding a product using a rotary head extruder that comprises feeding an extrudable composition into a single barrel having at least one rotatable auger; conveying the extrudable composition toward a die assembly; and controlling a temperature of the extrudable composition within a defined temperature range. In some embodiments, the temperature is controlled within a range between about 260° F. and about 320° F. In other embodiments, the die assembly comprises (i) a stator having a stator head at the downstream end of the at least one rotatable auger and a stationary plate surrounding an outlet end of the stator downstream from the single barrel and (ii) a rotatable plate downstream and spaced apart from the stationary plate to define a die gap.

In some embodiments, controlling the temperature includes measuring the temperature of the die assembly, the extrudable composition disposed in the die gap, or both. In other embodiments, when the temperature of the die assembly or the extrudable composition present in the die gap is below the predefined temperature range, the heating mechanism applies heat to at least a portion of the die assembly to increase the temperature of the die assembly or the extrudable composition. The heating mechanism may be any suitable mechanism that is effective to apply heat to at least a portion of the die assembly to increase the temperature of the die assembly or the extrudable composition. In some embodiments, the heating mechanism includes a band heater. The band heater may at least partially enclose a portion of the die assembly and in particular may at least partially enclose one or more of the stator, the stator head, the stationary plate, or the rotor. In other embodiments, the heating mechanism may include providing a circulating fluid within a portion of the die assembly.

The extrudable composition may comprise one or more of whole grain corn meal, degermed corn meal, soybean grit, rice, whole grain flour, rice pea, brown rice, wheat flour, whole wheat flour, yellow lentil flour, green lentil flour, whole grain millet, crushed red pepper, black pepper, whole grain sorghum, chickpea, chickpea meal, chickpea flour, amaranth flour, quinoa flour, yellow pea flour, green pea flour, pea flour, navy bean black bean, pinto bean flour, potato flour, and other grain legumes or tubers whether in flour, powder or other granular form. In some embodiments, the extrudable composition has an in-barrel moisture content between about 14% to about 19%.

The term "extrudable composition" refers to a composition that is mixed into a substantially homogenous composition and prior to the composition being extruded.

Unless otherwise explicitly noted, all percentages in the disclosure refer to a percent by weight.

BRIEF DESCRIPTION OF THE DRAWINGS

The foregoing aspects and many of the attendant advantages of the present technology will become more readily appreciated by reference to the following Description, when taken in conjunction with the accompanying simplified drawings of exemplary embodiments. The illustrative, schematic drawings, briefly described below, are not to scale, are presented for ease of explanation and do not limit the scope of the inventions recited in the accompanying claims.

DETAILED DESCRIPTION

Figure 2:
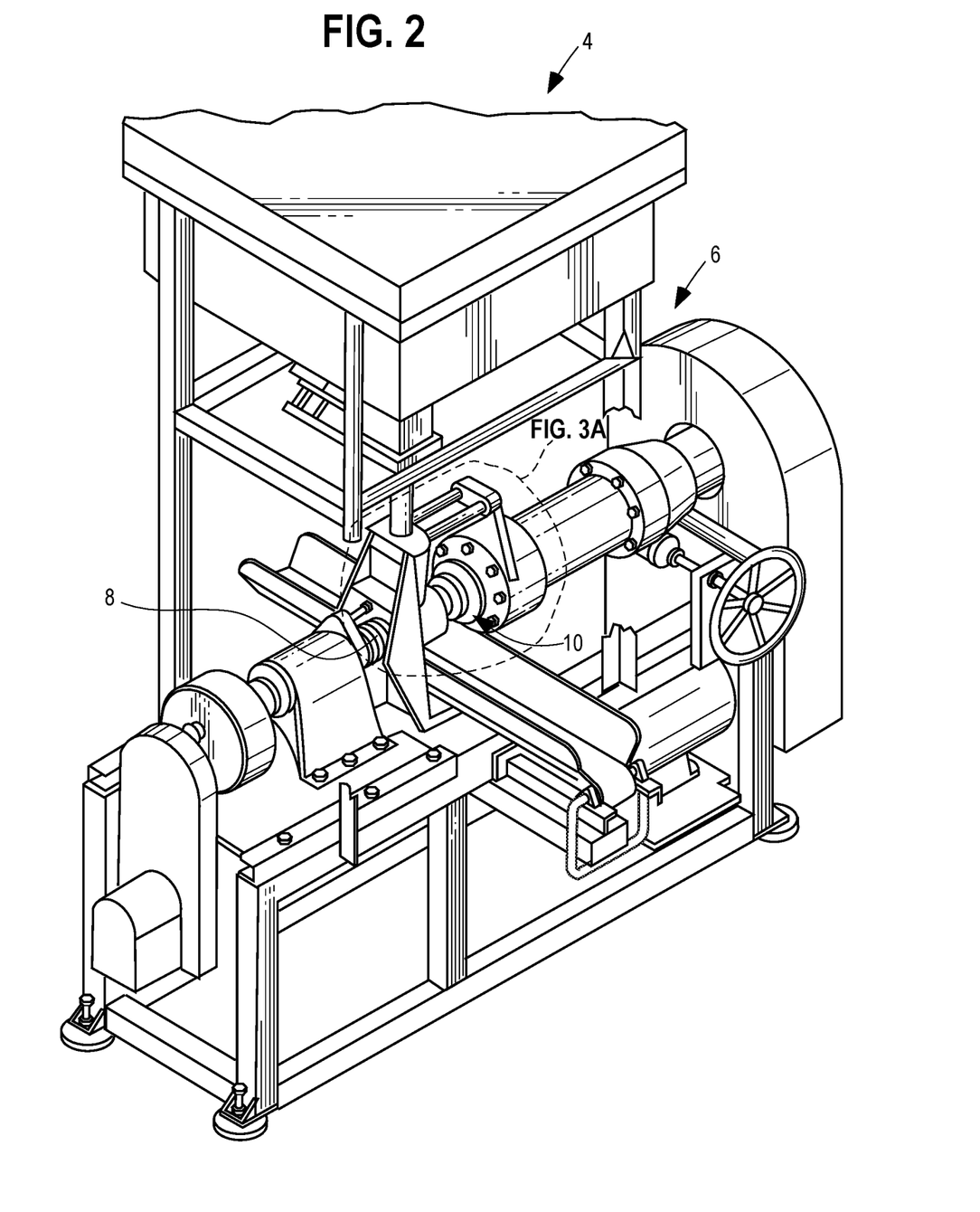
FIG. 2 is a perspective view of a rotary head extruder used in manufacturing collets of the kind shown in FIG. 1.

FIG. 1 depicts a well-liked variety of collets known as random collets 2, which are produced by a rotary head extruder 6. Random collets 2 comprise unique, twisted ("random") shapes and protrusions and a highly desirable crunchy texture that can only be produced with a rotary head extruder 6. FIG. 2 illustrates a perspective view of a typical rotary head extruder 6 used to produce the random collets 2. The production process comprises gravity-feeding an extrudable composition (not shown), typically in the form of pre-moistened flour or powder and sometimes referred to simply as the composition or extrudable composition, through a hopper 4 and into the rotary head extruder 6.

Figure 3A:
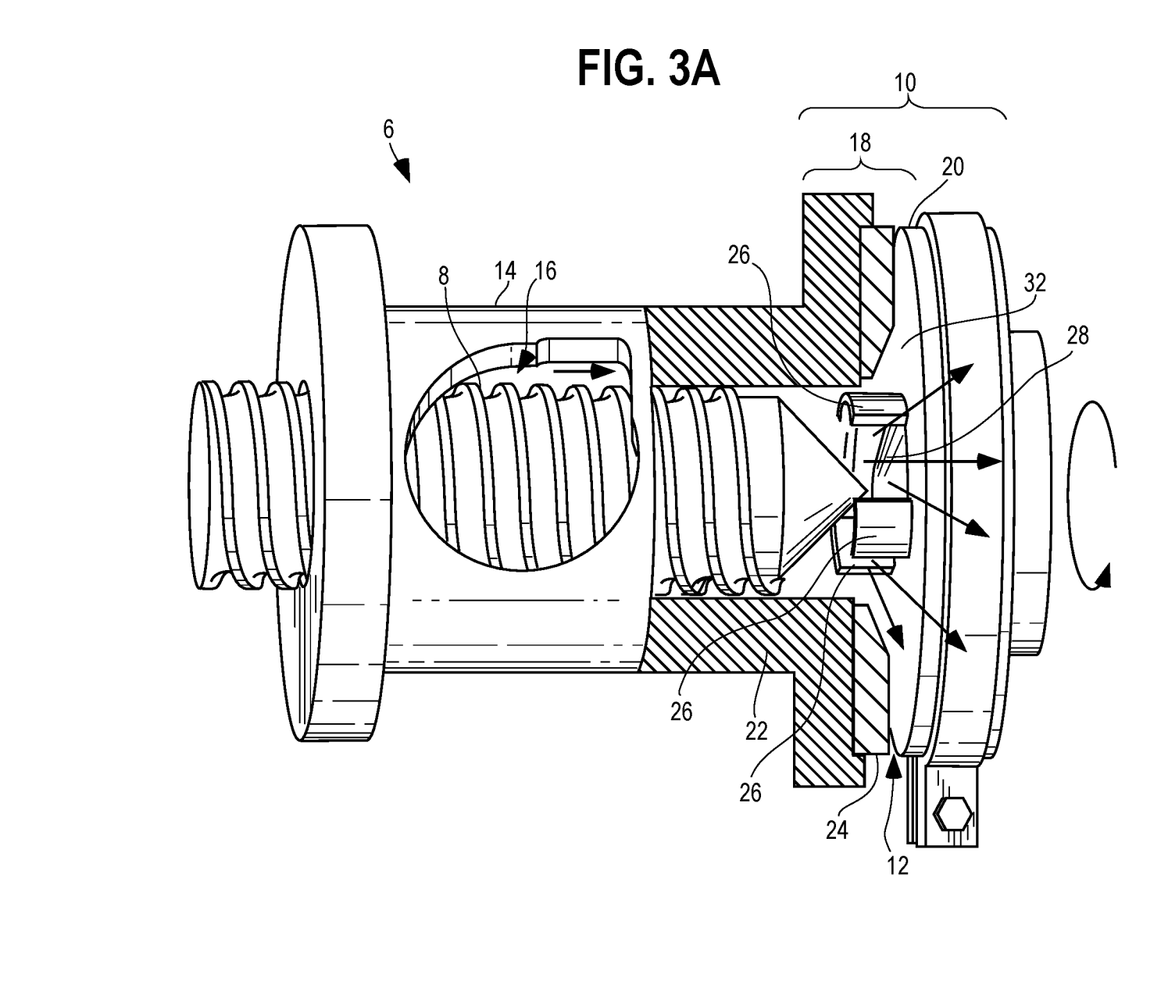
FIG. 3A is a partial cross-sectional view together with a perspective view of the main working components of the rotary head extruder shown in FIG. 2.
Figure 3B:
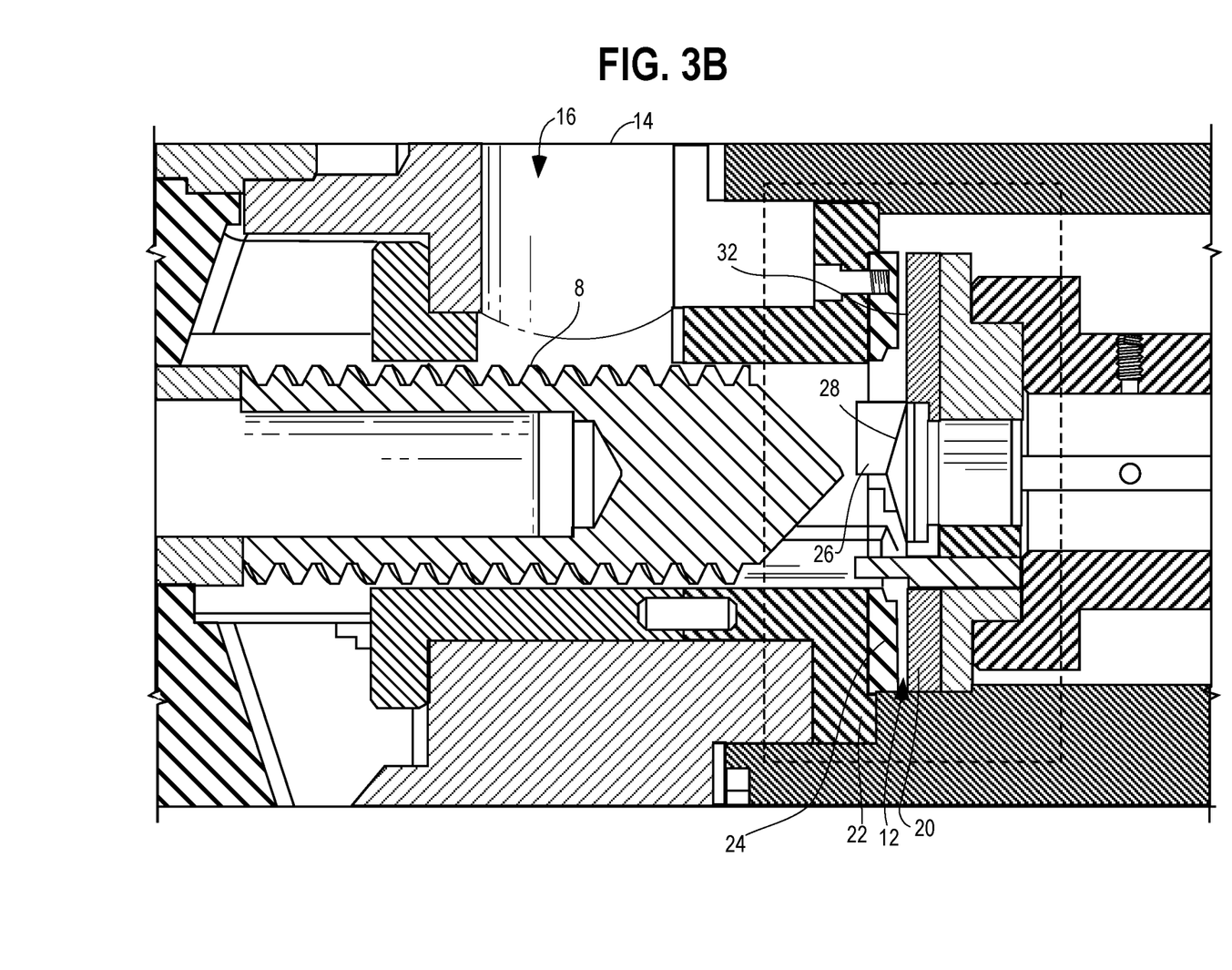
FIG. 3B is a detailed cross-sectional view of the rotary head extruder with emphasis drawn to the die assembly of the extruder shown in FIG. 2.
Figure 5A:
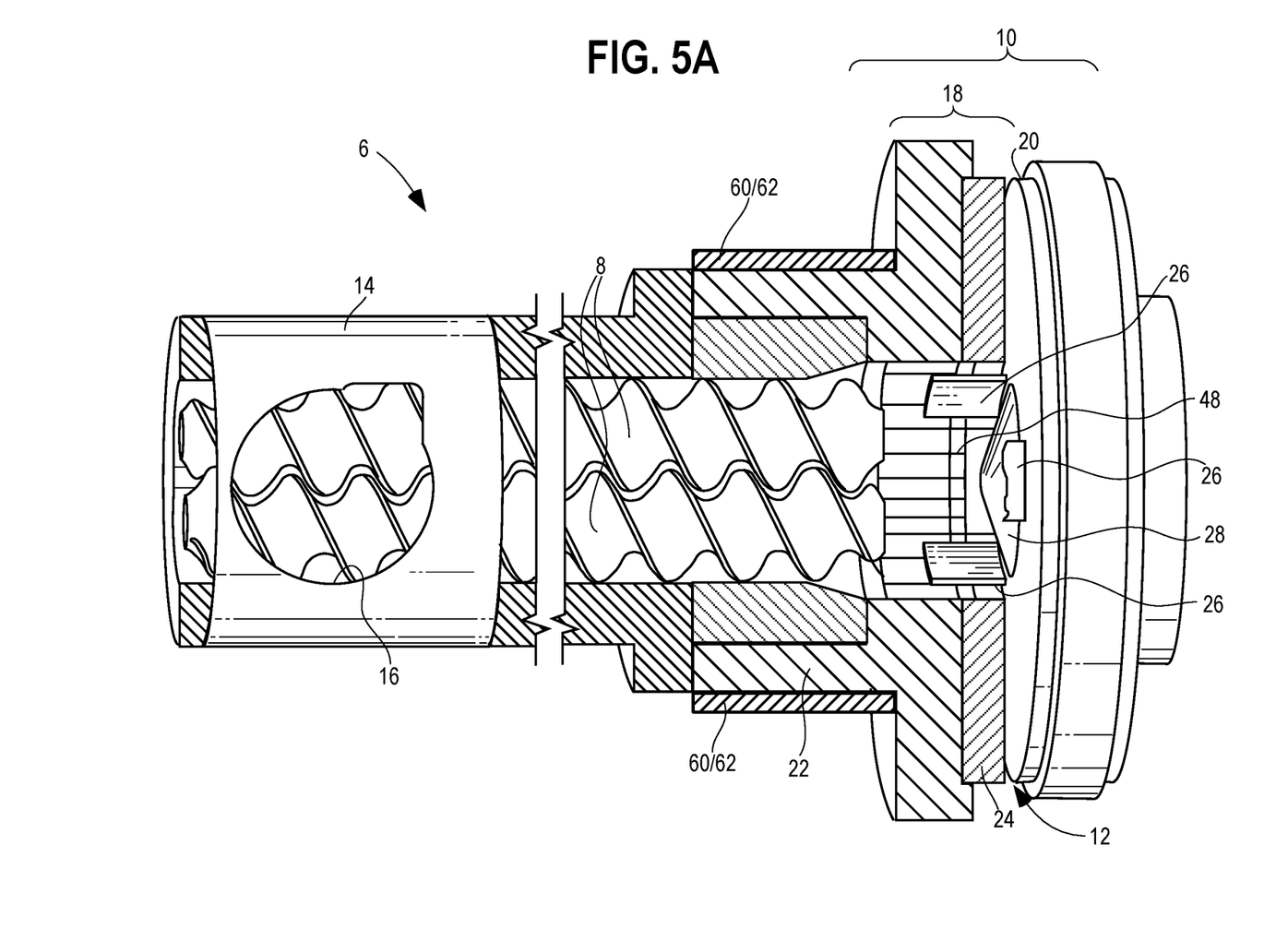
FIG. 5A is a partial cross-sectional view together with a perspective view of one embodiment of a rotary head extruder with one embodiment of a heating mechanism in the form of a band heater.
Figure 5B:
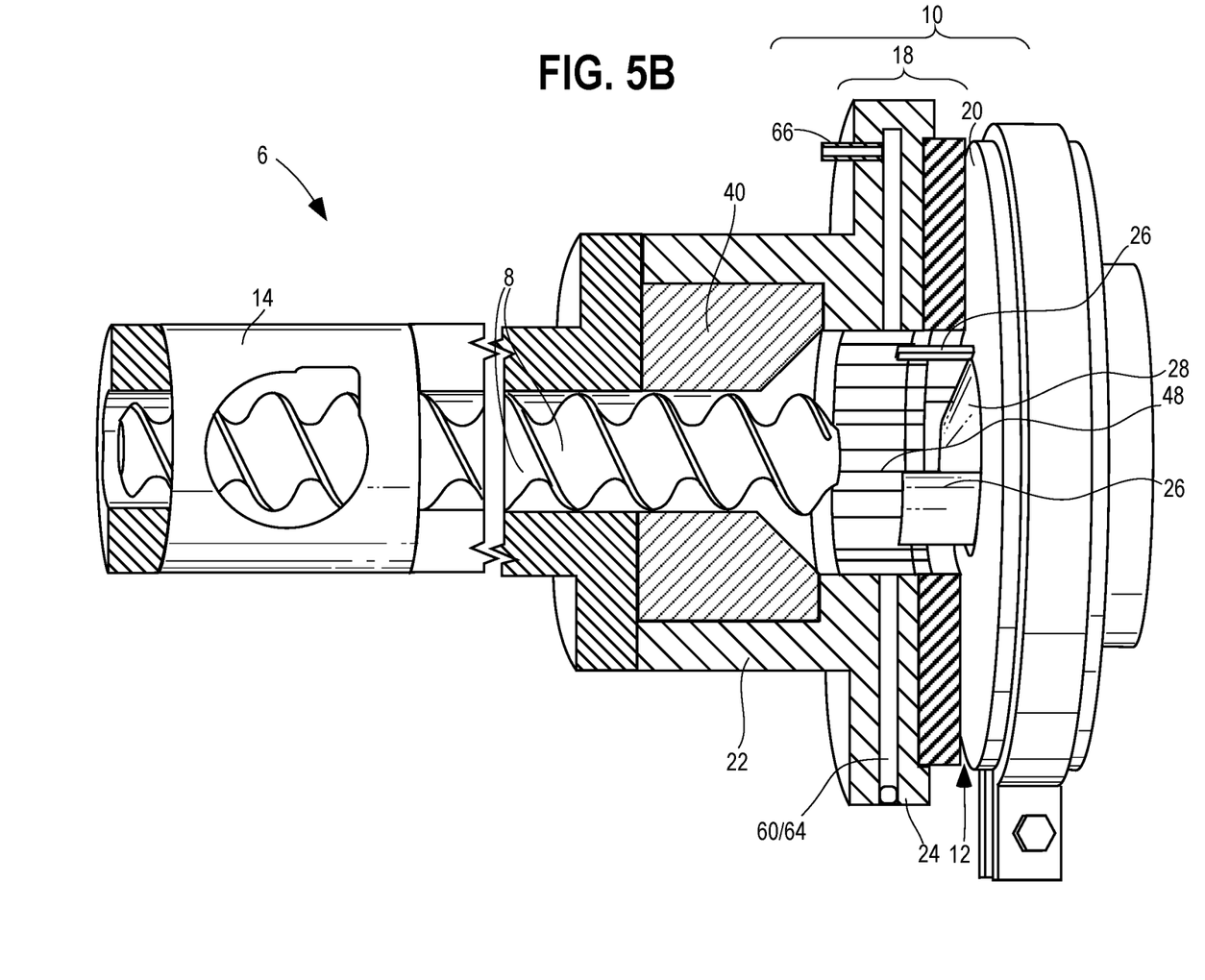
FIG. 5B is a partial cross-sectional side view of one embodiment of a rotary head extruder with another embodiment of a heating mechanism in the form of a channel for circulating temperature controlled liquid.

As depicted in FIG. 3A, the extrudable composition enters the extruder 6 through an opening 16, also referred to as an open feed section 16, in an outer cover 14, also referred to as a barrel 14, of the extruder 6. The barrel houses at least one auger 8, as shown in FIGS. 3A, 3B, and 5B, and may house multiple augers 8, as shown in FIG. 5A. It should be noted that the open feed section 16 is slightly turned in FIG. 3A to better depict the auger 8. In practice, the hopper 4 feeds into the open feed section 16 from above. Additionally, while the barrel 14 is shown to be quite short in the figures for clarity purposes, its portrayal is merely for purposes of depiction, and the barrel length is not drawn to scale. The auger 8 transports and compresses the extrudable composition, feeding it into a die assembly 10, where it is plasticized into a fluidized state and then cooked into collets 2.

As illustrated in FIG. 3A, the die assembly 10 comprises two main components: a stator 18 and a rotor or rotatable plate 20. The stator 18 further comprises a stator head section 22 and a stationary plate 24, which together act as a die through which the extrudable composition flows as it is plasticized. The stationary plate 24 and the rotatable plate 20 are located adjacent to one another with a die gap 12 disposed between the two. The cooking or gelatinization of the extrudable composition takes place between the two plates 20, 24, inside the die gap 12.

Figure 4:
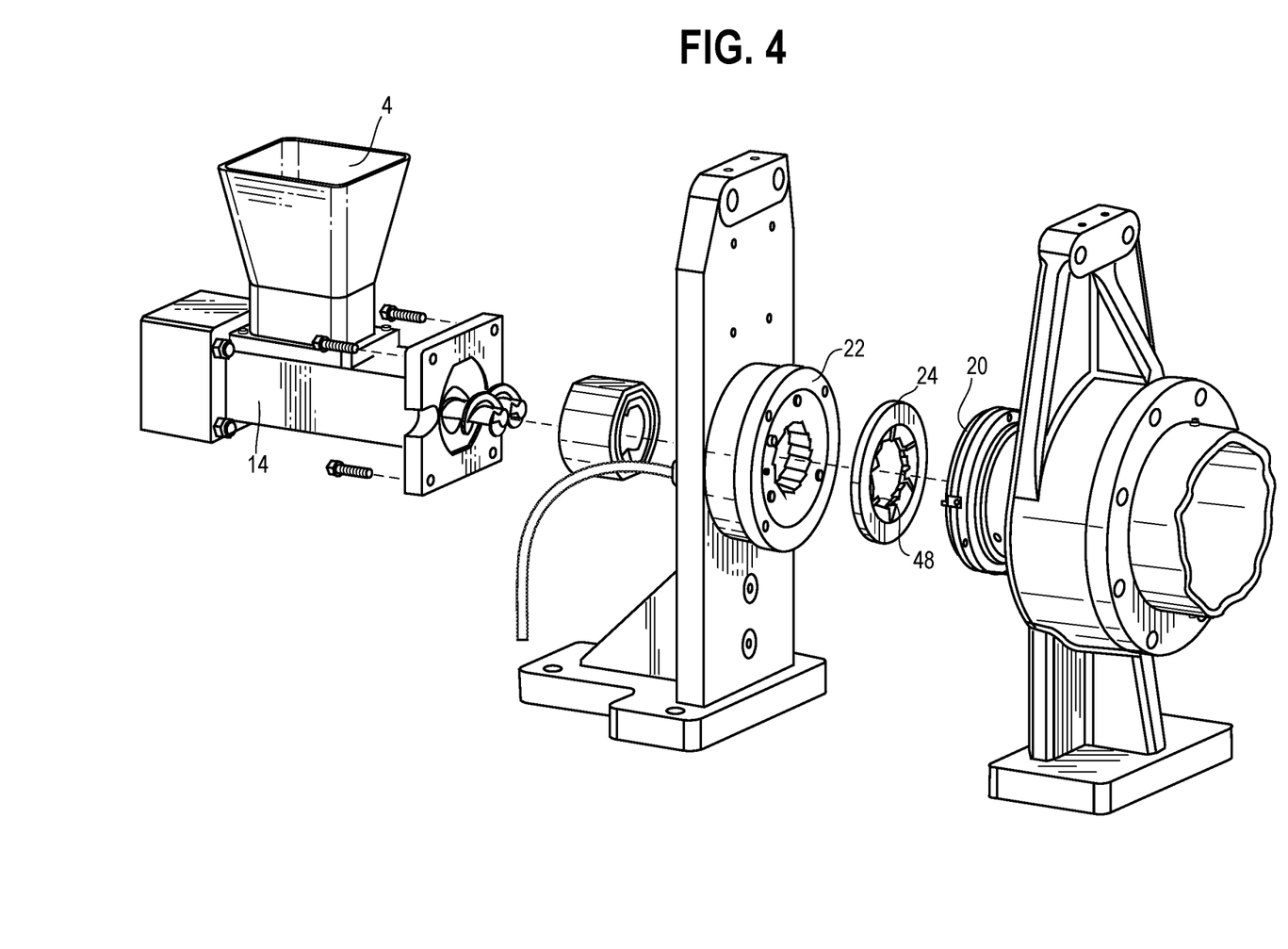
FIG. 4 is an exploded view of a rotary head extruder having two rotatable augers.

To aid in the gelatinization of the extrudable composition, the stationary plate 24 may include grooves 48, as shown in FIGS. 4, 5A, and 5B, that aid in the compression of the extrudable composition as it moves through the die gap 12. The rotatable plate 20 comprises fingers 26 and a nose cone 28, as can be seen in FIGS. 3A, 3B, 5A, and 5B. The nose cone 28 channels the composition towards the fingers 26 and helps discharge the gelatinized composition through the die gap 12. The fingers 26 force the composition into the grooves 48 of the stationary plate 24. The action of the fingers 26 generates friction and compression creating the necessary condition of pressure and heat to achieve plasticization of the extrudable composition in the die gap 12, located between the stationary plate 24 and the rotatable plate 20. The exploded view of these components of the extruder 6 can be seen in FIG. 4 and cross-sectional views are provided in FIGS. 5A and 5B. In some embodiments of the rotary head extruder 6, the rotatable plate 20 comprises an outer brass facing 32, which also helps to create heat and compression. Random extrusion may thus be characterized by a thermo-mechanical transformation of the extrudable composition brought about by the metal-to-metal interactions of the die assembly 10.

In some embodiments, the extruder 6, stator 18, and/or rotatable plate 20 may be formed from one or a combination of metals including, but not limited to, bronze, brass, silver, and/or various steel alloys to better conduct heat to the extrudable composition. Other metals may also be possible so long as friction heat is generated in operation of the extruder 6.

Several things happen within the die assembly 10 during the random extrusion process. First, the extrudable composition is subjected to high shear rates and pressure that generate most of the heat to cook the extrudable composition into collets 2. Second, the generated heat causes water present in the extrudable composition to turn to steam, puffing the composition as it exits the die assembly 10. Third, the flow of the extrudable composition between the rotatable plate 20 and the stationary plate 20 twists the expanding composition, causing it to be twisted and collapsed in places while remaining expanded in other places, resulting in cooked collets 2 having the characteristic random shape shown in FIG. 1. The random collets 2 exit the rotary head extruder 6 circumferentially outward from the die gap 12 in a radial path from the center of the cone 28 in the general direction of the arrows depicted in FIG. 3A. The process provides irregularly shaped collets 2 with a texture distinct in its crunchiness.

In existing extruders and extrusion methods, no additional heating is used to control the temperature of the composition or the extruder 6. Instead, the heat generated from friction increases the temperature of the stator 18 and, therefore, of the extrudable composition present in the stator 18 (the temperatures of each being generally the same, i.e., typically within about 5° F.) to a cook temperature to produce the collets 2. The cook temperature is typically between about 260° F. and about 320° F. (about 127° C. and about 160° C.), and may be between about 270° F. and about 310° F. (about 132° C. and about 154° C.), or between about 280° F. and about 305° F. (about 137° C. and about 151° C.), or between about 286° F. and about 300° F. (about 141° C. and about 148° C.). While the generated heat is usually sufficient to increase the temperature to cook the composition, it has been found that at times, the temperature fluctuates and it may drop below the minimum or desired cook temperature.

To ensure that the cook temperature is maintained, the described apparatus includes a heating mechanism 60. Referring to FIG. 5A, one embodiment of a heating mechanism 60 is shown in the form of a band heater 62. In some embodiments, the band heater 62 encloses all or a portion of the die assembly 10. To that end, the band heater may enclose all or a portion of one or more of the stator 18, the stator head 22, the stationary plate 24, or the rotatable plate 20.

FIG. 5B illustrates another embodiment of the heating mechanism 60. In this embodiment, at least one channel 64 is provided within the die assembly 10. The channel 64 permits a fluid (gas or liquid) to flow within the die assembly to transfer heat from the fluid to the die assembly. In some instances, the at least one channel may be provided within the stator 18. In other instances, the at least one channel may be provided within one or more of the stator head 22 or stationary plate 24. In yet other embodiments, the channel 64 may comprise a tube or hose (not shown) through which the fluid flows.

The fluid may be heated to a suitable temperature to transfer heat to the die assembly 10 to increase and/or maintain the temperature of the die assembly 10, and thus the extrudable composition, to the cook temperature noted above. The fluid may be heated via a heat exchanger of any kind; through boiling, convection, infrared technologies, electronic means; or any other means known in the art; or any combination thereof. The fluid may enter and exit the die assembly 10 through at least one port 66, as depicted in FIG. 5B. The fluid may be fed through the at least one port 66 via pump, funnel, or any other means, as may be known in the art.

Other embodiments of the heating mechanism 60 may include heating strips (not shown) present at one or more locations on or adjacent to the die assembly 10. In yet other embodiments, electronic or electromagnetic currents (not shown) may be used to increase or maintain the temperature of the die assembly, including one or more of the stator 18 or the rotatable plate 20, and thus the composition. It is also contemplated that the heating mechanism 60 may include blowing heaters, heat lamps, and adjustment of the atmospheric temperature within a confined space (not shown).

In still other embodiments, other components of the rotary head extruder 6 may be heated by any of the means previously described. Those other components may include, but are not limited to, the one or more augers 8, the fingers 26 of the stationary plate 24, or the grooves 48 of the rotatable plate 20. The present disclosure of a heating mechanism 60 is not dependent on the extruder 6 taking any particular form and is not hindered by any variation in the extruder 6. Any apparatus or method for applying heat to the composition by heating any or all parts of the die assembly is contemplated by this invention.

Another aspect of the present disclosure relates to methods of forming random extruded products. In one aspect, the method includes feeding various raw materials into a hopper 4 to form an extrudable composition, which outlets to a hole 16 in a barrel 14 of a rotary head extruder 6. The barrel 14 encloses one or more augers 8, which, through rotation, convey the extrudable composition toward a die assembly, which includes a stator 18 and rotor 20 with a die gap between the stator 18 and the rotor 20. The method may further include controlling the temperature of the die assembly or the extrudable composition disposed in the die gap within a predefined temperature range by a heating mechanism 60. In that regard, the temperature may be controlled within a range from about 260° F. to about 320° F. (about 127° C. to about 160° C.), and may be between about 270° F. to about 310° F. (about 132° C. to about 154° C.), or between about 280° F. to about 305° F. (about 137° C. to about 151° C.), or between about 286° F. to about 300° F. (about 141° C. to about 148° C.).

The controlling may include measuring the temperature of one or more of the die assembly, any portion of the die assembly, or the extrudable composition including the extrudable composition disposed in the die gap. Further, the controlling may include providing an external source of heat to at least a portion of the die assembly to maintain the temperature of the die assembly or the extrudable composition disposed in the die gap at the cook temperature, when the measured temperature of the die assembly or the extrudable composition disposed in the die gap is below the defined cook temperature. To that end, the external source of heat may include one or more of the heating mechanisms 60 described above.

As noted above, a wide range of raw materials may be formed into random collets using the described improved rotary head extruder device and method. In this regard, raw materials that contain lower levels of starch and higher levels of fat and/or fiber as compared to degermed corn meal can be used to produce satisfactory random collets using the described apparatus and method. Exemplary raw materials forming the extrudable composition may include, but are not limited to, one or more of whole grain corn meal, soybean grit, rice, whole grain flour, rice pea, brown rice, wheat flour, whole wheat flour, yellow lentil flour, green lentil flour, whole grain millet, crushed red pepper, black pepper, whole grain sorghum, chickpea, chickpea meal, chickpea flour, amaranth flour, quinoa flour, yellow pea flour, green pea flour, pea flour, navy bean meal or flour, black bean meal or flour, pinto bean meal or flour, potato flour, and other grain legumes or tubers whether in flour, powder or other granular form.

In addition, it is believed that the described apparatus and method will be able to successfully produce high quality random collets from an extrudable composition formed from 100% degermed corn meal obtained at any harvest time and, in particular, during the November to March harvest season in North America where it has been observed that the degermed corn meal has a lower bulk density than during March to November harvests.

Raw materials having a moisture between about 1.0% to about 18% may generally be used to form the random extruded products using the described apparatus and method. In one embodiment, the method may include pre-moistening or pre-hydrating the raw materials for introduction into the rotary head extruder. In one embodiment, the raw materials comprise an initial moisture content of between about 11% to about 12.5%. Raw materials may be pre-hydrated to from about 14.5% to about 18% moisture by weight or between about 17% to about 18%. In one embodiment, the step of pre-mixing raw materials, may include mixing one type of raw material with water or with other raw materials with water for moistening prior to introduction into the improved rotary head extruder. In this way, different materials can be moistened to the same approximate moisture level, for example.

Further, it has been found that the described apparatus and method may produce acceptable random collets from blends formed from the above raw materials with or without degermed corn meal. In this regard, it has been found that, using the described apparatus and method, greater amounts of raw materials may be blended with degermed corn meal as compared to blends in which the described apparatus and method is not used. To that end, it has been found that the maximum amount of selected raw materials that can be blended with degermed cornmeal to produce satisfactory random collets using a prior art rotary extruder and method are shown in the following Table 1.

Advantageously, use of the described apparatus and method allows amounts of raw material(s) greater than the amounts recited in Table 1 to be used to produce satisfactory random collets. For example, as noted in the following table, using the described apparatus and method, satisfactory random collets can be formed from a blend containing at least 55% whole grain cornmeal blended with 45% degermed cornmeal. One of skill will appreciate that blends can be formed from the raw materials using varying amounts of the raw material greater than the amounts shown in Table 1 and can be about and up to about 95% when blended with degermed cornmeal. For example, it will be appreciated that a blend could be formed from 75% whole grain cornmeal and 25% degermed cornmeal.

| Raw Material | Maximum amount that can be blended with degermed cornmeal without the described apparatus and method |
| --- | --- |
| Whole Grain Cornmeal | 55% |
| soybean grit | 10% |
| Navy, pinto, black etc. bean meal | 10% |
| Yellow pea flour | 30% |
| Green pea flour | 30% |
| Brown rice | 30% |
| Yellow or green lentil flour | 30% |
| Whole grain millet | 50% |
| Crushed red pepper | 2% |
| Black pepper | 2% |
| Whole grain Sorghum | 50% |
| Chickpea meal | 10% |
| Amaranth flour | 10% |
| Quinoa flour | 10% |

In addition, it will be appreciated that blends of two or more raw materials with or without degermed cornmeal can be formed. For example, it is contemplated that a blend containing 60% whole grain cornmeal, 35% brown rice, and 5% black pepper can be successfully formed into satisfactory random collets according to the described apparatus and method.

While the concepts of the present disclosure are susceptible to various modifications and alternative forms, specific exemplary embodiments of the disclosure have been shown by way of example in the drawings. It should be understood, however, that there is no intent to limit the concepts of the present disclosure to the particular disclosed forms; the intention is to cover all modifications, equivalents, and alternatives falling within the spirit and scope of the invention as defined by the claims.

As used in this application, "upstream" and "downstream" refer to locations of objects relative to a location of another object with respect to the process direction, where "downstream" refers to the direction of flow of the materials to be extruded through the described apparatus.

As used in this application, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Specified numerical ranges of units, measurements, and/or values include, consist essentially or, or consist of all the numerical values, units, measurements, and/or ranges including or within those ranges and/or endpoints, whether those numerical values, units, measurements, and/or ranges are explicitly specified in the present disclosure or not.

Unless defined otherwise, technical and scientific terms used in this application have the same meaning as is commonly understood by one of ordinary skill in the art to which this disclosure belongs. The terms "first", "second", "third", and the like, as used herein do not denote any order or importance, but rather are used to distinguish one element from another. The term "or" and "and/or" is meant to be inclusive and mean either, all, or any combination of the listed items. In addition, the terms "connected" and "coupled" are not restricted to physical or mechanical connections or couplings, and can include electrical connections or couplings, whether direct or indirect. Direct connection and/or coupling can include such connections and/or couplings where no intermittent connection or component is present between two endpoints, components or items. Indirect connection and/or coupling can include where there is one or more intermittent or intervening connections and/or couplings present between respective endpoints, components or items.

Approximating language, as used in this application throughout the specification and claims, may be applied to modify any quantitative representation that could permissibly vary without resulting in a change in the basic function to which it is related. Accordingly, a value modified by a term or terms, such as "about," "substantially," or "essentially" is not to be limited to the precise value specified. In some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used in this application, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

It is to be understood that the above description is intended to be illustrative, and not restrictive. For example, the above-described embodiments (and/or aspects thereof) may be used individually, together, or in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled.

While only certain features of the described apparatus have been illustrated and described in this application, many modifications and changes will occur to those skilled in the art. It is, therefore, to be understood that the appended claims are intended to cover all such modifications and changes that fall within the true spirit of the invention.

The invention claimed is:

1. A rotary head extruder comprising:
   at least one rotatable auger disposed within a single barrel and having an upstream end and a downstream end;
   a die assembly comprising (i) a stator having a stator head at the downstream end of the at least one rotatable auger and a stationary plate surrounding an outlet end of the stator downstream from the single barrel and (ii) a rotatable plate downstream and spaced apart from the stationary plate to define a die gap; and
   a heating mechanism comprising an internal channel circumferentially disposed within the stationary plate and not in fluid communication with the die gap, for maintaining one or more of the temperature of the die assembly or an extrudable composition disposed in the die gap within a defined temperature range.

2. The rotary head extruder of claim 1, wherein the defined temperature is between about 260° F. and about 320° F.

3. The rotary head extruder of claim 1, wherein the heating mechanism does not reduce the temperature of the die assembly or of the extrudable composition disposed in the die gap.

4. The rotary head extruder of claim 1, further comprising at least one port in fluid communication with the internal channel.

5. The rotary head extruder of claim 1, further comprising a liquid disposed within the internal channel.

6. The rotary head extruder of claim 1, wherein the die gap is between about 0.8 and about 2.5 mm during operation of the extruder.

7. The rotary head extruder of claim 1, wherein the at least one rotatable auger comprises a single rotatable auger.

8. The rotary head extruder of claim 1, wherein the at least one rotatable auger comprises two rotatable augers.

\* \* \* \* \*